United States Patent Office 2,933,371
Patented Apr. 19, 1960

2,933,371
POTASSIUM SILICATE SOLUTIONS AND THEIR PREPARATION

Guy B. Alexander, Ralph K. Iler, and George W. Sears, Wilmington, Del., assignors to E. I. du Pont de Nemours and Company, Wilmington, Del., a corporation of Delaware No Drawing. Application April 19, 1955
Serial No. 502,504

7 Claims. (Cl. 23—110)

This invention relates to the improvement of potassium silicate solutions by treating them under certain conditions with a soluble salt of a polyvalent metal, to the novel potassium silicate solutions thus produced, and to processes for using them in depositing adherent phosphor coatings.

The potassium silicates of the invention are made by adding a soluble salt of a polyvalent metal to a solution of potassium silicate, heating at 80 to 120° C. until precipitation is complete, and separating the precipitate from the potassium silicate product.

One method for the formation of a uniform and adherent coating of phosphor particles is to cause the particles to settle from a liquid medium. This method is used in preparing luminescent screens in cathode-ray tubes which are used for television.

The phosphor, or mixture of phosphors, is preferably suspended in an aqueous solution of potassium silicate. The slurry is poured into a television tube and is allowed to settle onto the face of the tube. It is, of course, desirable that the phosphor form a uniform and adherent coating which will remain relatively unimpaired when the liquid is removed and the coating is dried in the course of further processing.

The potassium silicate solution can be added to the tube after an aqueous solution of a suitable salt has already been introduced. Thus there is in the tube, prior to the addition of the potassium silicate and phosphor, an aqueous solution of barium acetate, barium nitrate, and the like. The phosphor can be added at different times and so can the salt.

The settling process for forming phosphor coatings is old in the art and the specific phosphor used and the specific salts and other additives constitute, per se, no part of the present invention. Further details of suitable such processes and materials will be found in the Journal of Electrochemical Society, volume 99, No. 4, page 164, in an article "Liquid Settled Luminescent Screens" by Pakswer and Intiso. Reference may also be had to the Journal of the Electrochemical Society, volume 95, page 112 (1949), in an article by Sadowski entitled "The Preparation of Luminescent Screens." It will be understood that the present invention is directed to a novel process for obtaining a phosphor coating of increased wet adhesion by effecting the deposition of the phosphor from the novel potassium silicate solutions herein described.

A commercially available potassium silicate solution can be used. These ordinarily have a $SiO_2:K_2O$ weight ratio of about 1.9:1 to 2.7:1. For purposes of the present invention the ratio during the heat treatment is not important. Since the ratio will ordinarily be adjusted to 1.9:1 to 2.3:1 and more specifically to about 2.2:1 when used for settling phosphors, the ratio can advantageously be adjusted to the preferred figure or more broadly to the preferred range prior to the heat treatment.

Commercially available potassium silicate solutions ordinarily contain about 20 percent of $SiO_2$. Such solutions are made from potassium silicate glasses, a number of which were analyzed and found to contain small amounts of impurities as follows:

| | |
|---|---|
| $Al_2O_3$ | 0.02 to 0.05 |
| CaO | 0.01 to 0.03 |
| MgO | 0.01 to 0.03 |

These figures are all given as the percent of impurity by weight on the glass which is 70 percent $SiO_2$ by weight. When these glasses are dissolved, part or all of these impurities are found in the resulting solutions.

While commercial potassium silicate will contain calcium, magnesium, and other impurities, a solution should be relatively free from foreign matter and as free from impurities as is commercially practicable without going to high priced, reagent grade chemicals.

According to the invention a potassium silicate solution is treated with a water soluble salt of a polyvalent metal. By water soluble we mean that the salt should be soluble at least to the extent of 0.5 percent by weight in water at 20° C.

Thus calcium hydroxide or calcium carbonate are not satisfactory because they are not soluble in excess of about 0.1 percent by weight. If the treating agent is added as an aqueous solution such insoluble compounds would require the use of impracticably large volumes of water. If such insoluble compounds are added as undissolved particles they are quickly coated over with an insoluble silicate coating and thus made unavailable for further reaction.

Thus there can be used water soluble salts of polyvalent metals such as aluminum chloride, potassium aluminate, aluminum nitrate, aluminum acetate, aluminum formate, aluminum bromide and lithium aluminate. Salts of other polyvalent metals can be used such as zinc chloride, sodium zincate, potassium zincate, zinc acetate, ferric chloride, ferric acetate, tin tetrachloride, zirconium oxychloride, zirconium oxynitrate, nickelous chloride, cadmium chloride, cobaltic chloride, and sodium stannate. It is not preferred, however, to use those polyvalent metals which affect the phosphorescent screen because of the possibility of contamination of the phosphors. The metals precipitate with silicate and are not left in the potassium silicate solution in any considerable amount but it is often safer not to risk the introduction of such materials into the system. Aluminum on the contrary is not deleterious even though rather large traces are left in the potassium silicate solution.

Polyvalent metals of group IIa of the periodic system are preferred. Thus there can be used soluble salts of calcium, strontium, barium and magnesium. Such salts can be employed as calcium acetate, calcium nitrate, calcium chloride, barium acetate, barium chloride, magnesium chloride, magnesium acetate, magnesium nitrate, strontium acetate, strontium nitrate and strontium chloride. Of these, by far the best are the calcium salts, specifically calcium acetate.

The amount of the polyvalent metal salt used for treating a potassium silicate solution according to the invention should be such that there is provided 0.1 to 5 mol percent of the polyvalent metal ion based on the $SiO_2$ in the solution being treated. The use of smaller amounts of the polyvalent metal salt is not desired because a maximum benefit of the invention will not be obtained. The use of larger amounts is unnecessary and is wasteful because the excess merely combines with still more of the silicate to form a precipitate with a resulting loss of silicate.

Ordinarily 0.1 to 1.0 mol percent of the polyvalent metal salt based on silica is sufficient and 0.2 to 0.5 mol percent is preferred, especially with calcium and barium salts, because at this level a relatively smaller amount of precipitate will be formed and yet a maximum benefit of the treatment will be obtained.

In treating a potassium silicate solution according to the invention, calcium acetate, for example, can be dissolved in water and added to a commercial potassium silicate solution. Other polyvalent metal compounds can similarly be added and potassium hydroxide required for adjustment of ratio can be added at the same time.

It is preferred that the addition of the solution of the treating agent to the silicate be effected in a zone of intense mixing. It is also preferred that the treating agent be added at about room temperature, say 20 to 30° C. If the mixing is effected at higher temperatures or if the mixing is not thorough there is a tendency for the polyvalent metal compound to combine at once with the silicate and form a precipitate. For purposes of the invention it is desired rather that the solution of the treating agent be dispersed uniformly through the potassium silicate solution at low temperature without the formation of a visible precipitate and that precipitation be effected largely during the subsequent heating step.

The concentration of the potassium silicate solution being treated will often be as high as is practically obtainable. Thus the potassium silicate solution can contain about 20 percent or more of $SiO_2$ even taking into account the water added with the treating agent. More dilute solutions can, of course, be formed and heated and with some agents such as aluminum compounds it will be found most desirable to heat silicate solutions which contain a total of about 5 to 10 percent $SiO_2$. If more dilute solutions are used during the heating these can, if desired, be concentrated later.

A potassium silicate solution containing the indicated amounts of a soluble polyvalent metal compound is then heated according to the invention. Heating is conducted at a temperature from 80 to 120° C. and it continues until precipitation is complete. Temperatures from 90 to 100° C. are preferred, particularly as temperatures above 100° C. require the use of pressure equipment.

Ordinarily four hours is sufficient depending upon the temperature and the concentration of the treating agent. However, the solutions can advantageously be heated for as long at 24 hours at 95° C. The time of heating will vary with the amount of treating agent. Thus with 0.15 mol percent of calcium acetate at least 4 to 8 hours at 98° C. is necessary whereas with 0.3 mol percent of the same reagent beneficial results are obtained in as little as one hour.

The time required can easily be determined for any particular polyvalent metal compound at a particular concentration and temperature. This can be done by withdrawing a sample from time to time, filtering and heating the sample to see whether a further precipitate forms. When no further precipitate is found then it can be assumed that precipitation is complete.

As a practical matter, it will be found that about four hours will be required at around 95 to 98° C. At lower temperatures the time should be about doubled for each 10° drop in temperature. At higher temperatures shorter times will be sufficient.

After the heat treatment the solution is filtered to remove the precipitate. The precipitate can instead be removed by centrifuging or by other techniques.

If the treatment is made using a dilute potassium silicate solution, the filtered solution can be concentrated as by evaporation, either at atmospheric pressure or reduced pressure. The solution can be concentrated to appropriate strengths for handling, say 15 to 20 percent $SiO_2$ by weight.

The product obtained by the heat treatment is a water-white potassium silicate solution containing a much reduced amount of calcium, magnesium, and other impurities.

The exact mode of operation of the invention is not understood. It is thought that trace amounts of calcium and magnesium in the potassium silicate have an adverse effect upon the adherence of phosphors settled from the potassium silicate solution. It is not understood why this effect should occur but it may be that calcium or magnesium are present as colloidal particles which are so small as to be below the limit of resolution of the electron microscope at 50,000 times magnification. These particles may function as nuclei so that when the barium acetate or other barium salt solution is mixed with the silicate containing the phosphor the resulting colloidal barium silicate grows on these nuclei instead of acting as a bonding agent for the phosphor film.

The operation of the treating agent is not understood, but it is thought that by adding a soluble polyvalent metal compound and thus forming a precipitate of the metal with silicate, the calcium and magnesium silicate nuclei are co-precipitated and thereafter removed upon filtration. In any event, whatever the cause the treatment with a polyvalent metal makes potassium silicate solutions of ordinary commercial purity highly effective for use in settling and bonding phosphors.

The potassium silicate solutions produced according to the invention are novel and yield results not obtainable with untreated commercial solutions. The solutions can only be defined in terms of the method of their preparation because chemical analysis and physical examination has so far failed to reveal the nature of the chemical or physical modification.

In order that the invention may be better understood reference should be had in the following illustrative examples:

*Example 1*

Twenty-three hundred pounds of potassium silicate solution containing 448 pounds $SiO_2$ and having a $SiO_2:K_2O$ weight ratio of 2.2:1 was charged into a jacketed tank.

The temperature of the solution was raised to 95° C. by introducing 85 pounds steam pressure into the jacket.

The contents of the tank were stirred with a mixer having propellers driven in opposite directions. An external line of two inches diameter was attached to the tank and the silicate was circulated from the tank in this line through a pump of 40 gallons per minute capacity and back to the tank. Concentric in the two inch pipe was a one-quarter inch diameter pipe, the outlet of this pipe being very near to the blades in the circulating pump. Through this one-quarter inch pipe a solution of calcium acetate was added to the heated silicate solution. For this purpose four pounds of calcium acetate was dissolved in ten gallons of water and this was added to the silicate through the pipe as noted over a period of about 10 to 15 minutes. This corresponds to about 0.3 mol percent calcium acetate based on the $SiO_2$ in the silicate.

A slight precipitate formed immediately after the addition of the calcium acetate to the silicate solution. The mixture was heated for four hours at 93 to 96° C. whereupon an additional precipitate of calcium silicate formed.

After four hours of heating, the silicate solution was cooled and filtered.

The effectiveness of the potassium silicate solution for settling phosphors was tested by a procedure as follows:

Flat glass plates, 2" square, were cleaned in ammonium bifluoride solution and laid in the bottom of 400 milliliter beakers. Three different barium acetate cushions were used, each of 300 milliliter volume, and containing 0.257, 0.286, and 0.314 gram of barium acetate per liter of settling solution.

A 150 milliliter slurry was prepared containing 0.66 gram of a standard zinc cadmium sulfide television tube phosphor and 21 milliliters of a potassium silicate solution containing 8.7 percent $SiO_2$ prepared by dilution of the treated silicate solution to be tested. This solution was rapidly stirred for two minutes and then 50 milliliter aliquots were added to each of the barium acetate cushions in a manner to distribute the phosphor evenly throughout the cushion. The phosphor was then allowed to settle for 20 minutes.

To test the wet adherence of the phosphor coating to the glass plate, a jet of water was directed in a direction normal to the coated plate, still submerged in the cushion, the jet having a diameter of about one millimeter, and delivering 160 milliliters of water per minute, the distance from the orifice to the plate being 1 9/16" and the duration of each jet being 5 seconds. The glass plate was then removed from the cushion, rinsed by submersion in distilled water, and allowed to dry.

The diameter of the holes produced by the water jet was measured by placing the plates over a piece of black plastic having holes of various diameters marked on its surface in white ink and observing the largest circle size visible through the hole. In reporting the results of the determination the optimum barium acetate concentration is used. Thus the diameter of the smallest hole found with any of the three barium acetate solutions is reported.

The potassium silicate prepared as above was tested for phosphor adhesion and the hole diameter was 0–2 millimeters. The untreated potassium silicate gave a hole diameter of 8 millimeters.

Instead of adding the calcium acetate solution at 95° C. the procedure as above described can be followed but modifying it to add the calcium acetate at room temperature, say about 20° C. The process above described can also be modified by heating the mixture after addition of the calcium acetate for 24 hours prior to filtration. In each of the modified procedures just described the wet adherence is 0 millimeter hole diameter.

The potassium silicate solution prepared as in this example can be appropriately diluted, mixed with a television phosphor and employed for settling a phosphor.

*Example 2*

A commercial grade of potassium silicate containing 19.7 percent $SiO_2$ and having a weight ratio of $SiO_2:K_2O$ of 2.26:1 was diluted to 8.7 percent $SiO_2$ with distilled water. The distilled water contained sufficient sodium aluminate to give an $SiO_2:NaAlO_2$ weight ratio of 47.5:1. The amount of aluminum compound is 1.5 mol percent of Al based upon the $SiO_2$. This solution was heated just below boiling for four hours during which time a heavy gelatinous precipitate formed. A precipitate was filtered off to give a water-white potassium silicate solution.

The solution thus obtained is suitable for settling phosphors in making television picture tubes. When a potassium silicate prepared as in the above example was tested for phosphor adhesion the hole diameter was zero. When a sample of the potassium silicate without the aluminum treatment was similarly diluted and used in this test the hole diameter was measured as 10 millimeters.

*Example 3*

Two parts by volume of a commercial potassium silicate solution containing 20.4 percent $SiO_2$ and having a $SiO_2:K_2O$ weight ratio of 2.2:1 was dilute with three parts by volume of distilled water to give a potassium silicate solution containing 9.3 percent $SiO_2$. A 1.5 molar solution of potassium aluminate was added in such amount that the final solution contained 0.0122 gram of potassium aluminate per gram of $SiO_2$.

The solution thus prepared was heated with live steam to a temperature near boiling for a period of 15 hours. The treated solution, contained a thin layer of gelatinous precipitate which was removed by filtration.

The potassium silicate solution thus obtained is suitable for use in depositing phosphors. Its effectiveness was tested according to the method described in Example 1 and the hole diameter was found to be 1 millimeter. A similar wet adherence measurement was made on the same potassium silicate diluted to the same extent but not treated with potassium aluminate. Hole diameters for this solution were 7 millimeters.

*Example 4*

Two hundred parts by weight of a commercial potassium silicate solution containing 20 percent $SiO_2$ was diluted with 258 parts by weight of water containing 0.51 percent by weight of potassium aluminate. The resulting solution had a $SiO_2:K_2O$ weight ratio of 2.3:1.

The solution was heated with live steam for a period of four and one-half hours. A copious gelatinous precipitate was formed during the heating and this was filtered off to give a water-white solution.

The solution thus obtained is suitable for settling phosphors in making television picture tubes. The adhesive quality of this solution was tested as in Example 1 and the minimum hole size was 4 millimeters. The starting, commercial silicate solution was similarly diluted with distilled water to give a potassium silicate solution as in this example containing 8.7 percent $SiO_2$. This solution was similarly tested and minimum hole diameter was 8 millimeters.

*Example 5*

A commercial potassium silicate containing 19.7 percent $SiO_2$ and having a $SiO_2:K_2O$ weight ratio of 2.34:1 was diluted to a concentration of 8.7 percent $SiO_2$ with water which contained sufficient sodium aluminate to give a $SiO_2:NaAlO_2$ weight ratio of 47.5:1 (0.0211 g. $NaAlO_2$/g. of $SiO_2$). The amount of aluminum compound is 1.5 mol percent of Al based upon the $SiO_2$.

This solution was heated with live steam for 12 hours and a heavy gelatinous precipitate formed. The precipitate was filtered off to give a slightly opalescent filtrate.

The solution thus obtained is suitable for settling phosphors in making television picture tubes. The adhesive qualities of the solution were tested as described in Example 1. The minimum hole diameter was 5 millimeters. The starting, commercial silicate solution was diluted with water to the same extent and the dilute silicate was allowed to stand at room temperature over night. The solution was then tested for wet adherence and the minimum hole diameter was 8 millimeters.

*Example 6*

To 108 parts by weight of potassium silicate containing 19 percent $SiO_2$ and having a $SiO_2:K_2O$ weight ratio of 2.1:1, two parts by weight of a 1.0 molar solution of $Na_2SnO_3$ and 141 parts by weight of water were added with vigorous stirring. The amount of sodium stannate corresponds to 0.6 mol percent based on $SiO_2$.

The mixture was heated at 95° C. for four hours, cooled and filtered.

The potassium silicate thus obtained is suitable for use in settling phosphors. It was tested for wet adherence as described in Example 1 and the hole diameter was 5 millimeters, whereas for an untreated control the hole diameter was 14 millimeters. When the treatment was repeated with one-fourth the amount of sodium stannate, a hole diameter of 7 was obtained.

*Example 7*

A sodium zincate solution was prepared by reacting freshly precipitated, washed zinc hydroxide with sodium hydroxide. The zincate solution was 4NaOH and contained 2.35 percent Zn.

A potassium silicate solution was treated as in Example 6 but using the sodium zincate instead of sodium stannate.

Using 0.15 mol percent of zincate based upon $SiO_2$ and heating the solution four hours at 95° C., a hole diameter of 6 millimeters was obtained as against 14 for the untreated control. The solution thus obtained is suitable for settling phosphors in making television picture tubes.

*Example 8*

As in the above examples, 108 parts by weight of a potassium silicate solution containing 20 percent $SiO_2$ and having a $SiO_2:K_2O$ weight ratio of 2.1:1 there is added 2 parts by weight of a 1 molar barium chloride solution. This amounted to 0.6 mol percent $BaCl_2$ based on $SiO_2$.

The mixture was heated at 95° C. for four hours, cooled and filtered.

The resulting solution was suitable for use in settling phosphors. Using a wet adherence test as in Example 1 the product of this example gave a hole diameter of 4 millimeters as against 7 millimeters for the untreated control.

*Example 9*

To a solution of potassium silicate at room temperature, having a silica concentration of 19.4 percent and a $SiO_2:K_2O$ weight ratio of 2.25, a 5 percent solution of calcium chloride was added, using a high degree of agitation such that the resulting mixture contained 0.6 mol percent Ca ion based on the silica treated.

This clear solution was then heated in an atmosphere of live steam for a period of 4 hours, after which it was cooled, and the precipitate removed by filtration. Whereas the untreated silicate gave a wet adherence of 8 millimeters hole diameter, the treated solution gave a wet adherence of 3 millimeters hole diameter.

*Example 10*

To a solution of potassium silicate containing 19.7 percent silica, having a $SiO_2:K_2O$ weight ratio of 2.25, and having a wet adherence as measured by the technique of Example 1 of 8 millimeters hole diameter, a 5 percent calcium acetate solution was added to give a mixture containing 0.3 mol percent calcium based on the silica treated. For this treatment, the silicate was preheated to 97° C. and the mixing was effected at the impeller of a centrifugal pump used to withdraw silicate from the container and return it after addition of calcium acetate.

The mixture, containing a small amount of precipitate, was divided into four parts and heated as follows: (1) 8 hours at 90° C., (2) 16 hours at 90° C., (3) 4 hours at 110° C., (4) 8 hours at 110° C. All samples were cooled and the heavy precipitates removed by filtration. The wet adherence values obtained from these solutions were as follows: (1) 2 millimeters, (2) 3 millimeters, (3) 0 millimeter, (4) 0 millimeter.

We claim:

1. In a process for preparing a potassium silicate solution adapted for use as a suspending and cementing agent for phosphors, the steps comprising adding to a potassium silicate solution a soluble salt of a polyvalent metal, said salt being soluble at least to the extent of 0.5% by weight in water at 20° C. and said metal being selected from the group consisting of aluminum, barium, cadmium, calcium, cobalt, iron, magnesium, nickel, strontium, tin, zinc and zirconium, in the amount of 0.1 to 1 mol percent of the metal based upon $SiO_2$ in the potassium silicate solution, heating the mixture at 80 to 120° C. until no further precipitate forms, and filtering the potassium silicate solution to remove the precipitate.

2. In a process for preparing a potassium silicate solution adapted for use as a suspending and cementing agent for phosphors, the steps comprising adding to a potassium silicate solution at room temperature a soluble salt of a metal selected from group IIa of the periodic system, said salt being soluble at least to the extent of 0.5% by weight in water at 20° C., in the amount of 0.1 to 1 mol percent of the metal based upon $SiO_2$ in the potassium silicate solution, heating the mixture at 80 to 120° C. until no further precipitate forms, and filtering the potassium silicate solution to remove the precipitate.

3. In a process for preparing a potassium silicate solution adapted for use as a suspending and cementing agent for phosphors, the steps comprising adding to a potassium silicate solution at room temperature calcium acetate in the amount of 0.1 to 1 mol percent of calcium based upon $SiO_2$ in the potassium silicate solution, heating the mixture at 80 to 120° C. until no further precipitate forms, and filtering the potassium silicate solution to remove the precipitate.

4. In a process for preparing a potassium silicate solution adapted for use as a suspending and cementing agent for phosphors, the steps comprising adding to a potassium silicate solution at room temperature an aluminum salt that is soluble at least to the extent of 0.5% by weight in water at 20° C., in the amount of 0.1 to 1 mol percent of the aluminum based upon $SiO_2$ in the potassium silicate solution, heating the mixture at 80° to 120° C. until no further precipitate forms, and filtering the potassium silicate solution to remove the precipitate.

5. In a process for preparing a potassium silicate solution adapted for use as a suspending and cementing agent for phosphors, the steps comprising adding to a potassium silicate solution at room temperature a barium salt that is soluble at least to the extent of 0.5% by weight in water at 20° C., in the amount of 0.1 to 1 mol percent of the barium based upon $SiO_2$ in the potassium silicate solution, heating the mixture at 80° to 120° C until no further precipitate forms, and filtering the potassium silicate solution to remove the precipitate.

6. In a process for preparing a potassium silicate solution adapted for use as a suspending and cementing agent for phosphors, the steps comprising adding to a potassium silicate solution at room temperature a calcium salt that is soluble at least to the extent of 0.5% by weight in water at 20° C., in the amount of 0.1 to 1 mol percent of the calcium based upon $SiO_2$ in the potassium silicate solution, heating the mixture at 80° to 120° C. until no further precipitate forms, and filtering the potassium silicate solution to remove the precipitate.

7. In a process for preparing a potassium silicate solution adapted for use as a suspending and cementing agent for phosphors, the steps comprising adding to a potassium silicate solution at room temperature a magnesium salt that is soluble at least to the extent of 0.5% by weight in water at 20° C., in the amount of 0.1 to 1 mol percent of the magnesium based upon $SiO_2$ in the potassium silicate solution, heating the mixture at 80° to 120° C. until no further precipitate forms, and filtering the potassium silicate solution to remove the precipitate.

References Cited in the file of this patent

UNITED STATES PATENTS

| | | |
|---|---|---|
| 1,836,093 | Taylor et al. | Dec. 15, 1931 |
| 2,088,281 | Smith | July 27, 1937 |
| 2,241,791 | Rembert | May 13, 1941 |
| 2,763,567 | Nagy | Sept. 18, 1956 |
| 2,774,682 | Larach | Dec. 18, 1956 |
| 2,784,060 | Santmyers | Mar. 5, 1957 |

OTHER REFERENCES

Vail-Soluble Silicates, vol. 1, 1952, pp. 215, 262.